Dec. 30, 1952  J. W. GRAY  2,623,996
CAPACITY MOTION RESPONSIVE DEVICE
Filed June 10, 1948  2 SHEETS—SHEET 1

INVENTOR
JOHN W. GRAY
BY
H. S. Mackey
ATTORNEY

Dec. 30, 1952     J. W. GRAY     2,623,996
CAPACITY MOTION RESPONSIVE DEVICE

Filed June 10, 1948     2 SHEETS—SHEET 2

INVENTOR
JOHN W. GRAY
BY
ATTORNEY

Patented Dec. 30, 1952

2,623,996

UNITED STATES PATENT OFFICE 2,623,996

CAPACITY MOTION RESPONSIVE DEVICE

John W. Gray, White Plains, N. Y., assignor to General Precision Laboratory Incorporated, a corporation of New York Application June 10, 1948, Serial No. 32,091

6 Claims. (Cl. 250—27)

This invention relates to a linear capacity motion responsive device. More specifically the invention relates to a capacitive or electrostatic mechanism associated with suitable electronic circuits whereby a given mechanical motion is translated into an electrical quantity which is directly and linearly proportional to the degree of mechanical motion.

Many different arrangements have heretofore been proposed to perform the general function of translating small mechanical displacements into electrical quantities which may then be used to directly operate an indicating instrument or through the medium of other apparatus act as a means for remotely controlling various types of instrumentation as in telemetering systems such as servo controls or the like.

In general the devices heretofore proposed have depended on electromagnetic phenomena to perform the desired purposes. Such devices, however, require specially wound coils so that true linearity of response is obtained; they are affected by stray magnetic fields which are particularly difficult to guard against in many industrial installations and they are affected by temperature variations and saturation effects.

The instant invention depends on electrostatic phenomena and is not affected by heat so that it may be used where high temperatures exist without destroying its accuracy of operation. Likewise, since electrostatic fields are easily shielded against, the device may easily be protected from stray fields that may exist in any particular installation. Additionally the moving portions of the apparatus may be made very light so that little force is required for the operation thereof and the apparatus may have a very low inertia.

To accomplish these functions and purposes, the instant invention contemplates the provision of a movable plate or probe which is variably positioned between two fixed plates dependent upon the degree of mechanical movement or deflection imparted to the movable plate. The fixed plates are energized by a voltage so that in moving across the space between the fixed plates, the movable plate assumes the potential that would exist at any location if this plate or probe were not there. In other words, as the movable plate is caused to traverse the path from one fixed plate to another, the potential of the movable plate varies from the potential of one to that of the other in a linear fashion.

In order that this linearity may be maintained and that there be no distortion of output it is essential that no appreciable current be taken from the probe plate and that there be no capacitive or resistance loading in the circuit connected to the probe plate. An essential feature of the present invention, therefore, resides in the provision of circuit arrangements whereby these requirements are satisfied.

In the instant invention amplifier systems have been devised which utilize negative feedback circuit or circuits in such a fashion that practically zero current is taken from the probe plate and the amplifier delivers whatever power is required in any particular application.

The very fact of connecting an electrical conductor between the movable probe plate and the input of an amplifier would ordinarily result in such a capacity and resistive loading thereof as to introduce so much distortion as to render such a device of little utility for its intended purpose. The conductor connecting the probe plate and the input of the amplifier has a certain capacity as respects ground and the tube elements themselves have an internal capacity which would constitute an adverse load upon the probe plate. In the instant invention the negative feedback circuits used nullify and eliminate these adverse influences so that the potential assumed by the probe plate at any position in its movable range may be converted to a useful power output without any deleterious loading effects which would operate to produce an output departing from true linearity.

The exact nature of the invention will be more fully appreciated from a consideration of the following detailed description when taken together with the attached drawings, in which.

Figure 1:
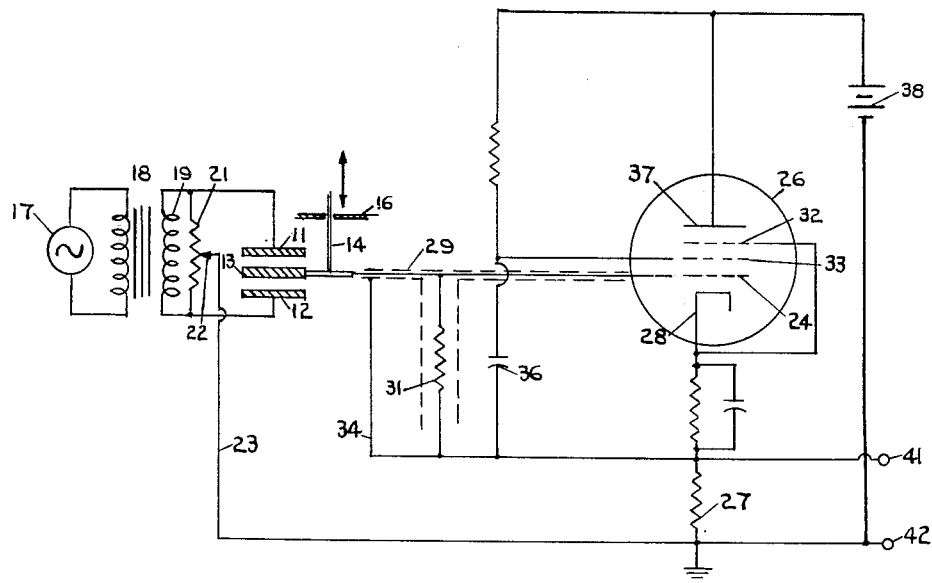
Figure 1 is a schematic diagram of one form of the invention.

Referring now to the modification disclosed in Fig. 1, a thin movable plate or electrostatic probe 13 is mounted between two fixed plates 11 and 12. The movable plate 13 may if desired be made somewhat smaller than the fixed plates 11 and 12 so that the fringing of the electrostatic field at the edges of these plates does not affect the linearity of potential of the movable plate as it moves from a position adjacent one plate to a position adjacent the other. On the other hand the fringing effect may be counteracted by suitable shaping of the outside plates. In either event it is important that the potential of the movable plate in its travel across the space between the fixed plates be a true linear function of the position thereof and this may be accomplished by either of the methods just mentioned.

Linear movement may be imparted to the movable plate 13 in any desired manner and the mechanism for imparting such movement is here illustrated diagrammatically by a rod 14 movable in a direction longitudinal of its length in guides 16. The specific mechanism which imparts the required movement forms no part of the instant invention and it may take any one of a multitude of forms depending in large measure on which of any one of a great number of applications to which the instant invention is put. For example, the rod 14 may be connected to a pressure diaphragm or other pressure or differential pressure measuring apparatus to provide an output which is a linear function of pressure or difference in pressure and in such instances the travel may be made very small if connected to delicate instruments such as aneroid barometers, for example, .01 inch.

On the other hand, the mechanism might well be used for such a widely different purpose as a phonograph pickup, the exciting voltage being of intermediate frequency so that the output may be delivered to the intermediate stages of a radio receiver thereby reducing troublesome low frequency pickup that is sometimes bothersome in radio phonograph combinations. In such an instance the rod 14 would be actuated by the stylus of the phonograph pickup the movement of the plate 13 being imparted by the movement of the stylus in the record groove.

Whatever the use, which as the two examples just given indicate covers an extremely wide range, the plate 13 is made to move through the space between the fixed plates 11 and 12 by such mechanism and in such a manner as the circumstances of use dictate.

The fixed plates 11 and 12 are energized from a source of alternating current voltage 17 through a transformer 18, the opposite ends of the secondary 19 of which are respectively connected to plates 11 and 12. An intermediate point of the secondary 19 is grounded through the medium of potentiometer 21, movable contact 22 and conductor 23. The exact intermediate point of the secondary which is placed at ground potential will depend on the position of contact 22 on the potentiometer 21 and hence the point of zero potential between the plates 11 and 12 may be adjusted over a desired range for purposes that will presently appear.

Assuming for the moment that the contact 22 is at the midpoint of its range, fixed plates 11 and 12 will have impressed thereon alternating current potentials of equal amplitudes and opposite phase and these may be made as high as is desired so that little or no voltage amplification is required of the remainder of the system. If under such circumstances the movable plate 13 is exactly midway between the plates 11 and 12 no potential will be impressed thereon since this point in the space between the two fixed plates 11 and 12 is a point of zero electrostatic potential. Any movement of the plate 13 to one side or the other, however, will cause this plate or probe to assume an alternating current potential whose amplitude is directly proportional to the degree of movement from the mid-point. That is to say, the potential of the plate 13 will vary in amplitude in a continuous manner from that of the plate 11 when it is in contact therewith, through zero, to a potential of the opposite phase when the plate 13 contacts plate 12 in the movement of plate 13 through its entire range.

In commercial manufacture it may be difficult and economically unfeasible to provide a mechanism in which at the zero or at rest position the plate 13 is located exactly midway between the plates 11 and 12. To allow for manufacturing tolerances and to offset any discrepancies resulting therefrom, the system utilizes the potentiometer 21 and movable contact 22. By adjusting the position of contact 22 the point of zero potential may be varied in its position between the fixed plates 11 and 12 so as to be made to correspond with any desired or assumed position of the plate 13, thereby constituting a zero adjustment. If such a refinement is not desired the secondary 19 may be grounded at its midpoint and in that case the point midway between the plates 11 and 12 will always be the point of zero potential.

The space between the plates may be an air space or it may be filled with liquid of as high a dielectric constant as is desirable in any particular instance.

The probe plate 13 is connected to the control grid 24 of a pentode 26 which is provided with a high unbypassed resistance 27 in its cathode lead providing a large amount of negative feedback for the cathode 28 and causing the tube to be operated as a cathode follower. The lead connecting the probe plate 13 and the control grid is provided with a shield 29 which may also shield the grid resistor 31.

An inherent capacity exists between the grid lead and its shield 29 and also between the control grid 24, cathode 28, suppressor grid 32 and screen grid 33 which if not eliminated or at least minimized to a large extent constitutes a capacity load on the probe plate 13 which seriously affects the desired linearity of response.

In the present instance the shield 29 is connected to the cathode side of the resistor 27 through a conductor 34 and the screen grid 33 is connected to the same point for alternating currents by a condenser 36. Additionally, the suppressor grid 32 is directly connected to the cathode 28. The plate is directly connected to the positive side of a potential supply source, here indicated as a battery 38 for simplicity and clearness of illustration, and the negative side of this source is connected to ground to which is also connected the end of resistor 27 remote from the cathode 28. The potential drop occasioned by the output of the tube 26 therefore occurs across this resistor and the output may be derived from terminals 41, 42 to be utilized in any desired manner. At the same time this potential drop serves to increase the potential of the cathode 28 as respects ground so that any increase in control grid potential is accompanied by an almost equal increase in cathode potential. In other words, the potential of the cathode follows that of the control grid. This is a well understood phenomenon of cathode follower or negative feedback circuits of this type, the voltage gain always being very slightly less than unity.

Inasmuch as the potential of the cathode always closely approaches that of the control grid 24, whatever it may be, as occasioned by the relative position of the movable plate 13 with respect to the fixed plates 11 and 12, the shield 29, suppressor grid 32 and screen grid 33 which are connected to the cathode likewise follow the changes in control grid potential. The actual capacitance between the control grid and these electrodes, therefore, is not effective as a load on the probe plate. Likewise the loading effects of the grid resistor 31 and shield 29 are nearly eliminated. That is, since these elements are always made nearly the potential of the grid 24 and probe plate 13 there is very little potential difference existing between the grid lead and its surrounding shield and the effect of the capacity existing between these elements is reduced in like proportion to the reduction in potential difference.

The tube 26 of course, has a voltage gain of less than one and therefore the potential existing at the output terminals 41 and 42 is not as great as the potential of the probe plate 13 but since as much alternating voltage as is desired may be impressed across the fixed plates 11 and 12 the lack of voltage amplification is not a problem.

In such cases where the lead from the plate 13 to the control grid 24 is quite long so that the capacity between the grid lead and its shield 29 is great the slight residuum of potential difference existing between the grid lead and its shield, as a result of the fact that the voltage gain of the tube 26 is slightly less than unity, may cause enough residual loading to produce noticeable nonlinearity.

Figure 2:
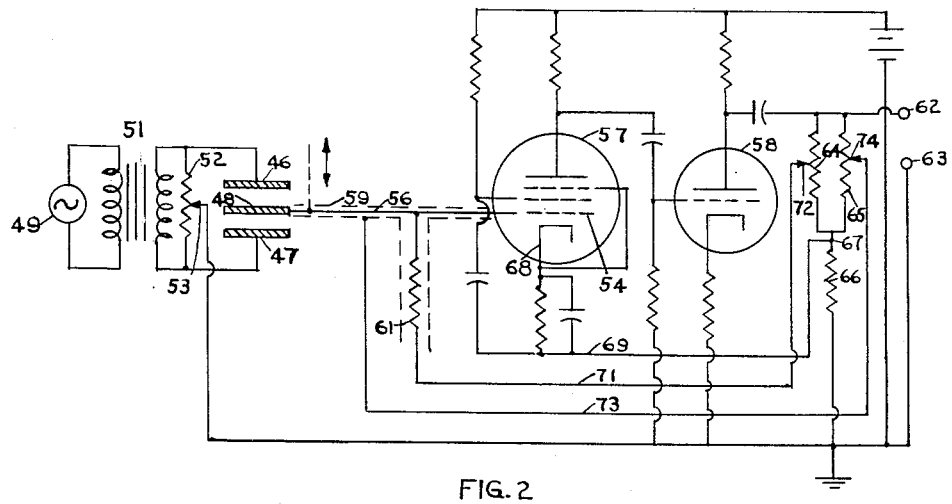
Figure 2 is a schematic diagram of a modified form of the invention.

In such cases, i. e., where the grid lead must be long, it is preferred to use the arrangement as illustrated in Fig. 2 wherein a two stage amplifier is utilized in such a fashion that the impedance as seen by the probe plate is made exactly infinite and no distortion is produced in the capacity responsive device.

In the circuit of Fig. 2 the capacity responsive mechanism is the same as that discussed in connection with the system of Fig. 1 comprising a pair of fixed plates 46 and 47 with a movable plate 48 located therebetween, the movable plate being actuated in any desired manner as discussed in connection with the modification of Fig. 1.

The fixed plates 46 and 47 are energized by an alternating current source 49 through the medium of a transformer 51 and a zero adjustment may be provided by connecting the potentiometer 52 having a movable contact 53 in parallel with the transformer secondary as heretofore described.

The probe plate 48 is connected to the control grid 54 of a two stage amplifier consisting of pentode 57 and triode 58 through a lead 56. An electrostatic shield 59 is provided for the lead 56 and this shield may also encompass the grid resistor 61.

The output of the initial amplifier stage 57 is coupled through a resistance capacity coupling circuit to the input of the second and final stage 58 and the voltage output is derived from terminals 62 and 63 connected to the output circuit of the final stage 58 which output circuit includes a resistor network comprising resistors 64, 65 and 66 connected in a series parallel combination between the output terminals.

In such an arrangement amplified alternating current voltage drops will be developed across the output resistor network which vary in the same sense as the potential applied to the control grid 54 of the first amplifier stage 57 and suitable negative feedback voltages are derived from this network to accomplish the function of eliminating loading effects on the probe plate 48 so that the output as derived from terminals 62 and 63 is at all times a true linear function of the relative position of the probe plate 48 as respects the fixed plates 46 and 47.

The main negative feedback loop for stabilizing the amplifier and preventing distortion is formed by connecting the cathode 68 of the tube 57 to the terminal 67 on the resistor network composed of resistors 64, 65 and 66, conductor 69 providing this connection. No voltage gain in the system is necessary for the reason that the alternating current potential applied to the fixed plates 46 and 47 may be as high as is desired, and the only function of the amplifier is as a power source and as a means for preventing as far as possible any current drain on the movable probe plate 48 so that the output is a true representation of the electrostatic potential of this member. Because no voltage gain is necessary the amount of negative feedback applied to the cathode 68 may be large and the cathode 68 may be made to approach very closely the alternating current potential of the grid 54. In other words, the signal potential existing between grid and cathode of tube 57 may be very low for a given output. Under these conditions the input admittance of the tube 57 is greatly reduced preventing the imposition of a load on the probe plate 48 as a result of such input admittance.

In addition to the main negative feedback circuit constituted by the conductor 69, a feedback circuit to the grid resistor 61 is established by the conductor 71 connected to the movable tap 72 on resistance 64 and a feedback circuit to the grid shield 59 is established by the conductor 73 connected to the movable tap 74 on resistor 65. These auxiliary feedback circuits are adjustable so that the grid lead 56 will draw exactly zero current either in phase or in quadrature with the impressed voltage, slightly greater voltages being fed back to these elements than to the cathode 68.

The feedback to the grid resistor 61 is adjusted by varying the position of the contact 72 until the feedback potential applied to the lower end of resistor 61 is just equal to the grid voltage. Under this condition no current flows in this resistor to act as an in phase drain on the probe plate 48.

The feedback to the shield 59 is made slightly higher than the feedback to the grid by suitably adjusting the contact 74 on the resistor 65 in order that the shield 59 shall be slightly increased in alternating current potential over that of the grid lead 56, thereby providing enough effective negative capacitance betwen grid lead and shield to cancel any residual unshielded capacitance to ground from the grid lead or grid, and by this means any in quadrature drain of current from the probe plate 48 is prevented.

By the use of these feedback circuits the impedance looking from the probe plate 48 becomes infinite so that the output derived therefrom is a true linear representation of the probe position as it would be if suspended between the plates 46 and 47 without any electrical connections being made thereto. That is to say, the deleterious effects which would ordinarily occur because of the necessary attachment of electrical circuits to the probe to obtain an indication of its electrostatic potential are eliminated.

Figure 3:
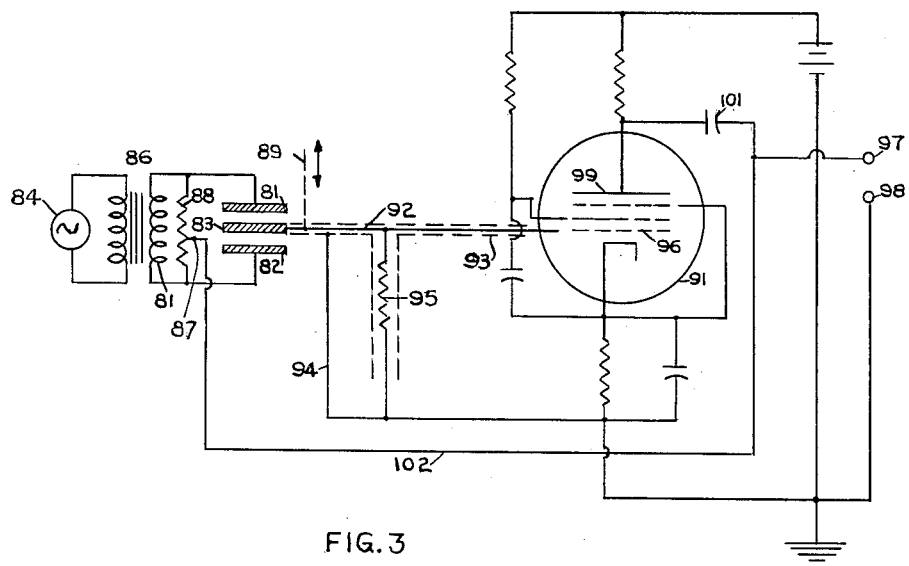
Figure 3 is a schematic diagram of a further modified form of the invention.

In the modification as disclosed in Fig. 3 a somewhat different arrangement of negative feedback is used to perform the same function of preventing loading of the probe plate.

In this modification the same capacity responsive mechanism is utilized consisting of fixed plates 81 and 82 energized through a transformer 86 from an alternating current source 84. The movable probe plate 83 positioned between the fixed plates 81 and 82 is changed in its relative position as respects the fixed plates by any desired mechanical motion as represented by the dotted line 89.

The probe plate 83 is connected to the control grid 96 of a pentode 91 by a grid lead 92 which is surrounded by a shield 93 which may also shield the grid resistor 95 and this shield is grounded by the conductor 94.

The useful output is derived from terminals 97 and 98, terminal 97 being connected to the anode 99 through coupling condenser 101 and terminal 98 being connected to ground to which the cathode, grid resistor 95 and grid lead shield 93 are also connected.

The negative feedback in this instance is provided by the conductor 102 connected between the output terminal 97 and the variable contact 87 of potentiometer 88, although if a zero adjustment is not desired as previously described the conductor 102 may be connected directly to a midtap on the secondary of transformer 86.

By this arrangement the negative feedback voltage is made substantially equal and opposite to the voltage the probe plate 83 would have had if the contact 87 were connected directly to ground. When the probe plate 83 is moved an output is produced which is negatively fed back to the transformer over conductor 102 and the actual potential of the probe plate is reduced to nearly zero as a result of the feedback circuit and because the probe voltage is reduced to nearly zero any stray, unshielded capacitance to ground will not cause serious loading. Likewise since the grid lead shield 93 is grounded there is very little potential difference existing between the grid lead and the grid lead shield so that the inherent capacity existing between these members does not result in sufficient loading of the probe plate 83 to draw a current therefrom which would affect the linearity of response of the system.

While in describing the invention to this point alternating current energization of the capacity motion responsive device has been referred to, the output obtained from the system being an alternating current potential which is directly and linearly proportional to the relative positions of the plates and probe, it will be equally apparent to one skilled in the art that where the relative motion of the plates and probe is relatively rapid as in a phonograph pickup or microphone, the plates may be energized by a direct current potential, the output obtained constituting an alternating current quantity which is proportional to the relative amount of movement.

Figure 4:
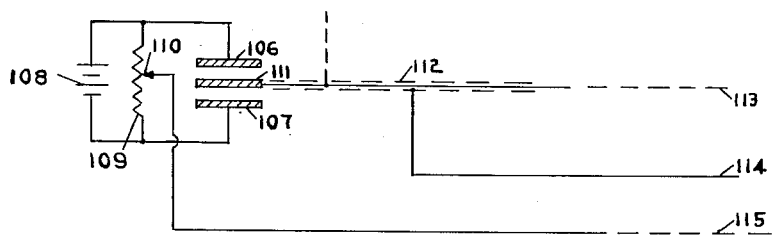
Figure 4 is a schematic diagram of a portion of the apparatus in which the capacity motion responsive device is energized by a source of direct current.

Fig. 4 illustrates one manner of providing such energization. The plates 106 and 107 are connected to the opposite terminals of a direct current source indicated diagrammatically as a battery 108. Where a zero adjustment is desired a potentiometer 109 having a movable contact 110 may be provided in shunt to the source 108. The probe 111, shield 112 and contact 110 may then be connected to any of the amplifier circuits described in Figs. 1, 2 and 3 as indicated by the dotted connections 113, 114 and 115.

It will also be appreciated by those skilled in the art, that the probe of the motion responsive device may be maintained stationary and the plates moved with respect thereto, the relative motion of these elements being the important factor.

What is claimed is:

1. A capacity motion responsive pickup device comprising a pair of plates located in fixed spaced relation with respect to each other, a source of electrical potential connected to said plates for creating an electrostatic field in the space therebetween, a probe interposed in the space between said plates, means providing relative motion between said probe and said plates whereby said probe assumes an electrostatic potential linearly dependent on its relative position as respects said pair of plates, a first discharge tube having at least an anode, cathode, and control grid, a conductor connecting said probe and said control grid, a shield for said conductor, a second discharge tube having its input circuit coupled to the output circuit of said first discharge tube, a resistance network connected in the output circuit of said second discharge tube, a negative feedback circuit connecting an intermediate point on said resistor network and the cathode of said first discharge tube, a feedback circuit connecting an intermediate point on said resistor network and said shield, a grid resistor having one end connected to the control grid of said first discharge tube and the other end connected through a feedback circuit to an intermediate point on said resistor network.

2. A capacity motion responsive pickup device according to claim 1 in which the feedback circuit for the grid resistor is connected to such a point on the resistor network that the fed back voltage is just equal to the control grid voltage.

3. A capacity motion responsive pickup device according to claim 2 in which the feedback circuit for the shield is connected to such a point of the resistor network that the fed back voltage causes the shield to assume a potential of the same sense but greater than the potential of the conductor connecting the probe and control grid.

4. A capacity motion responsive pickup device according to claim 3 in which said first discharge tube includes a suppressor grid and a screen grid each of which is connected to the negative feedback circuit for the cathode of said discharge tube.

5. A capacity motion responsive pickup device comprising a pair of plates located in fixed spacial relation with respect to each other, a source of electrical potential connected thereto for creating an electrostatic gradient in the space therebetween, a probe positioned in the space between the plates, means for moving said probe relative to said plates whereby said probe assumes an electrostatic potential linearly dependent on its position relative to said plates, a first discharge tube, a conductor connecting said probe and a control grid of said first discharge tube, a second discharge tube having its input coupled to the output of said first discharge tube, a resistance network connected in shunt to the output of said second discharge tube, a direct connection between a first intermediate terminal on said resistance network and the cathode of said first discharge tube, a grid resistor having one end connected to the control grid of said first discharge tube and its other end connected to a second intermediate terminal on said resistance network, a shield for said grid resistor and said conductor connecting said probe and control grid, and a direct connection between said shield and a third intermediate terminal on said resistor network the potential amplitude of which is greater than the potential amplitude of said second intermediate terminal.

6. A capacity motion responsive device according to claim 5 in which said first discharge tube additionally includes a suppressor grid and a screen grid, said suppressor grid being directly connected to said cathode and said screen grid being capacitatively connected to said cathode.

JOHN W. GRAY.

REFERENCES CITED

The following references are of record in the file of this patent:

UNITED STATES PATENTS

| Number | Name | Date |
| --- | --- | --- |
| 2,117,894 | Lenehan | May 17, 1938 |
| 2,178,985 | Blumlein | Nov. 7, 1939 |
| 2,200,055 | Burnett | May 7, 1940 |
| 2,282,319 | Brown | May 12, 1942 |
| 2,292,919 | Barco | Aug. 11, 1942 |
| 2,339,861 | Keeler | Jan. 25, 1944 |
| 2,377,869 | Elliott | June 12, 1945 |
| 2,399,213 | Edwards | Apr. 30, 1946 |
| 2,433,599 | Cohen | Dec. 30, 1947 |
| 2,443,125 | Weathus | June 8, 1948 |
| 2,446,390 | Rath | Aug. 3, 1948 |
| 2,458,632 | Parsons | Jan. 11, 1949 |
| 2,503,248 | Deeter | Apr. 11, 1950 |
| 2,508,586 | Veneklasen | May 23, 1950 |

OTHER REFERENCES

Electronics, vol. 10, January 1937, "Feedback Amplifier Design," by Terman, pages 12–15 and 50.